United States Patent Office 3,383,038
Patented May 14, 1968

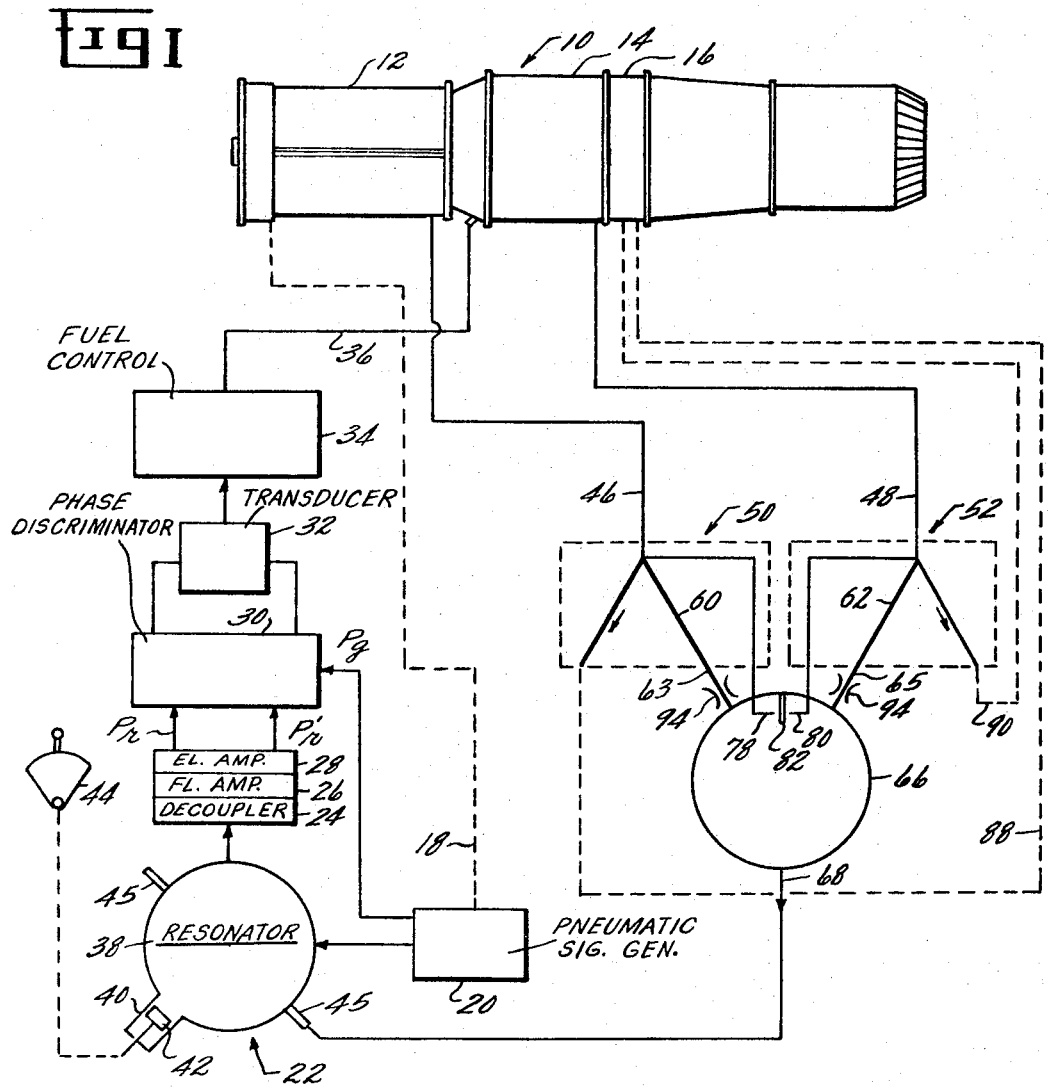

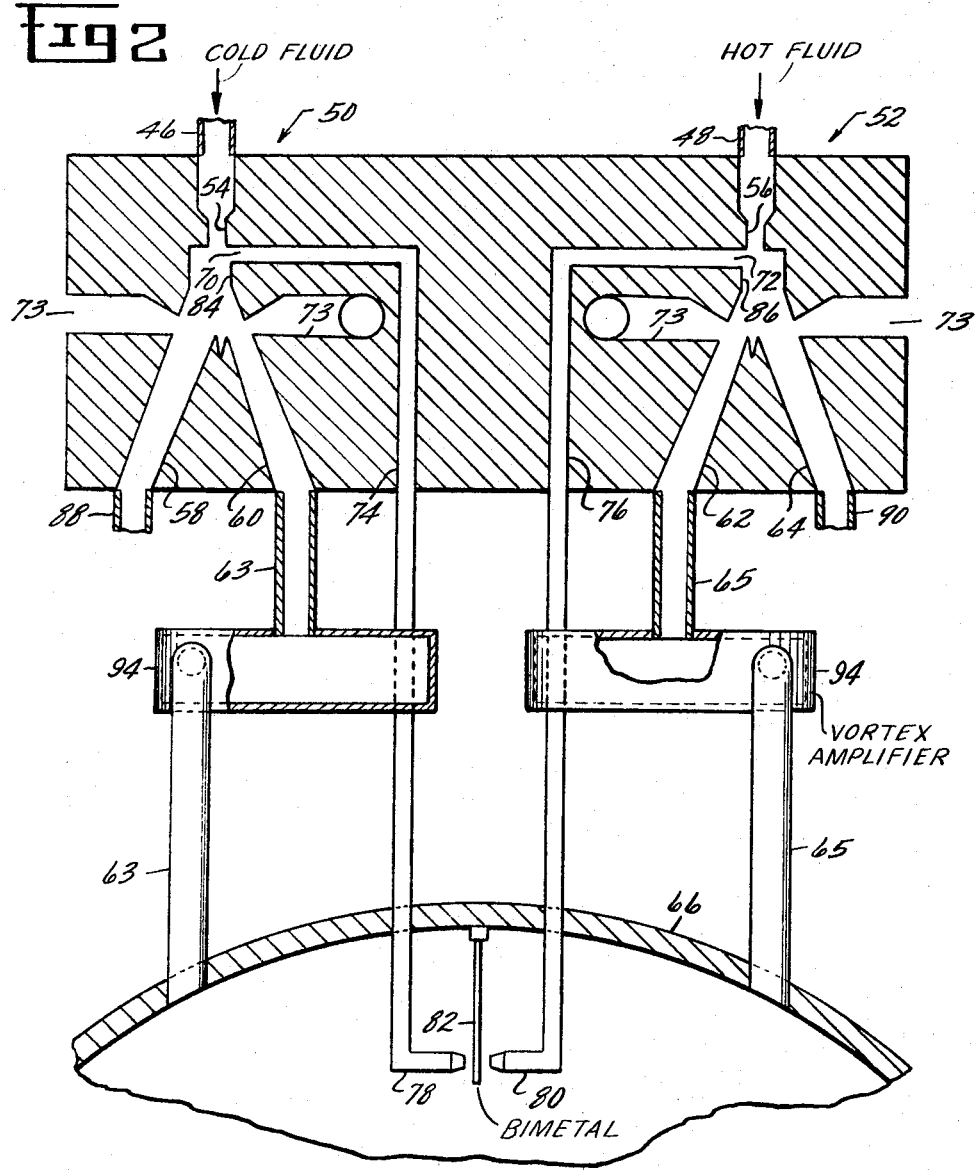

3,383,038
FLUID TEMPERATURE CONTROLS PARTICULARLY FOR GAS TURBINE ENGINES
Willis A. Boothe, Scotia, N.Y., assignor to General Electric Company, a corporation of New York
Filed Oct. 22, 1965, Ser. No. 500,697
4 Claims. (Cl. 236—13)

ABSTRACT OF THE DISCLOSURE

A fluid temperature control for providing a speed reference signal insensitive to the changes in the ambient operating temperature of a gas turbine engine. The reference signal generating means includes a chamber which has a fluid pressure signal input having a frequency proportionate to the rate of turbine rotation. The chamber is flushed with a constant temperature gas derived from the engine so that changes in the input signal thereto result in changes in its output strength, whereby an error signal may be derived to vary fuel flow and thus maintain the turbine at a desired rate of rotation.

The constant temperature gas for the chamber is derived from a plenum which has inputs respectively connected to the engine compressor discharge and the turbine inlet. Flow dividers divert hot or cool air into the plenum to maintain a desired temperature. The flow dividers have control ports which either divert the hot or cool air to the plenum or divert it back to the engine gas stream. A bimetal element in the plenum is effective against conduits connected to these control ports to control their pressurization for the described diverting function.

---

The present invention relates to improvements in providing a constant temperature fluid source and in a more specific aspect, to improved fluid sensing means for gas turbine engines which provides an output reflecting the rate of rotation of the engine turbine.

The present invention in its more specific aspects deals with the problems of providing fluid controls for the operation of gas turbine engines. Such engines basically comprise an axial flow compressor, mechanically connected by a shaft to a turbine. Fuel fed to a combustor intermediate the compressor and turbine provides hot gases which drive the turbine to in turn drive the compressor, as well as providing output energy which may be employed either directly as a thrust or converted to kinetic energy by a free turbine. In any event an essential parameter in controlling the operation of such engines is the rate of rotation of the turbine which can be varied by the amount of fuel fed to the combustor. While other parameters may be involved, the rate of fuel flow to the combustor is desirably controlled as a direct function of turbine rotational speed.

The advantages of employing fluid controls, sometimes broadly referred to as fluid amplifiers, in the operation of gas turbine engines are considerable. Such advantages will potentially give greater reliability, immunity to high operating temperatures which are hazardous for electronic components, as well as more economical, lighter, and compact mechanism.

One of the problems involved in the use of fluid controls is that the output of many fluid control components varies as a function of temperature. This is a particular problem in any sensing system where a fluid output is derived by the use of a reference signal that is pulsed within a chamber since the reference signal frequency is a function of the fluid temperature in such chamber. Thus there has been at least one proposal (identified below) to control engine operation through the use of such a reference signal compared to a turbine speed signal. The output obtained is not a direct function of turbine speed in that it also reflects temperature conditions.

One object of the invention is, therefore, to provide fluid control means for monitoring flow of fuel to a gas turbine engine as a direct function of the rate of rotation of its turbine or otherwise provide a fluid system output reflecting the rate of turbine rotation independently of changes in ambient temperature.

Another object of the invention is to provide improved means for deriving a substantially constant temperature source of fluid which are particularly useful in rendering fluid signals pulsed within a chamber independent of changes in the ambient temperature of the system.

These ends are obtained in a fluid sensing system for gas turbine engines having a rotating turbine by the provision of means for generating a fluid pressure signal which has a frequency proportionate to the rate of turbine rotation. Other means are provided for generating a reference signal by pulsing a gas within a chamber, with the pulsed gas being derived from the engine and maintained at a constant temperature. Pulsation frequency of the reference signal will be independent of any changes in the ambient operating temperature of the engine and this reference signal may then be compared with the fluid pressure signal proportionate to the rate of turbine rotation to obtain an output which is independent of ambient temperature changes. Preferably the constant temperature source is provided by deriving from the engine a relatively hot gas stream and a relatively cool gas stream and then mixing these hot and cool gases to obtain an intermediate constant temperature source. Advantageously the output of the sensing system is employed to control fuel flow as a direct function of turbine speed.

In the sense that the present invention provides means for supplying fluid at a constant temperature the invention is further characterized by the provision of first and second fluid flow dividers respectively connected to sources of pressurized fluid which are at different temperatures, one being relatively hot and the other being relatively cool, with cool temperature source no higher than a given temperature and the hot temperature source is no lower than this given temperature. Such flow dividers have two outputs and one output from each is connected to a plenum chamber. The flow dividers are further characterized by a control port which provides a control stream for selectively diverting fluid flow into one or the other of its outputs. These control ports are connected to the plenum chamber so that the control streams are derived therefrom. Means responsive to the temperature within the plenum chamber are provided for controlling the pressurization of said control ports so that when the temperature in the plenum is above the selected given temperature, the flow from the cooler source is diverted into the plenum and when the temperature of the plenum is below the selected temperature, fluid from the hot source is diverted therein.

The above and other related objects and features of the invention will be apparent from a reading of the following description of the disclosure found in the accompanying drawings and the novelty thereof pointed out in the appended claims.

In the drawings:
FIGURE 1 is a schematic and block diagram depiction of a preferred embodiment of the invention; and
FIGURE 2 is a view, primarily in section, illustrating in greater detail fluid flow control elements found in FIGURE 1.

FIGURE 1 illustrates a gas turbine engine 10 comprising an axial flow compressor section 12, a combustor section 14 and a turbine section 16, these being known, basic components of such engines. The compressor and turbine of this engine each have a rotor secured to a common shaft. A mechanical connection indicated at 18 is provided between the compressor rotor and a pneumatic signal generator 20 which generates two sinusoidal pressure signals, one of which is fed to a resonator 22 which generates a reference signal output which is then fed to a decoupler 24 and two stages of amplification 26 and 28 to generate signals $P_r$ and $R'_r$ which are 180° out of phase. The operation of this circuit is such that when the frequency of the reference signal generated by the signal generator 20 equals the resonant frequency of the resonator 22, the signals $P_r$ and $P'_r$, when matched against the other signal of the signal generator 20, indicated at $P_g$, by a phase discriminator 30, produce equal pressure outputs therefrom to a transducer 32.

If the frequency of the signal generator 20 is varied from that frequency which has been established by the resonant frequency of the resonator 22, there would then be a pressure differential between the two outputs of the phase discriminator 30 and an error signal will be generated by the transducer 32. This output signal is fed to a fuel control 34 to vary the amount of fuel fed through line 36 to the combustor of the engine. The rate of rotation of the compressor and turbine rotor is thus increased or decreased to generate a signal frequency (at generator 20) equal to the resonant frequency of the resonator 22 and thereby null out the error signal to the fuel control 34.

The above elements are more fully described in copending application Ser. No. 457,099, filed May 19, 1965, and assigned to the same assignee as the present application. In the application referred to, it is also pointed out that the resonant frequency of the resonator 22 is a function of the volume of its chamber 38. By providing a cylinder 40 and piston 42 which is connected to a pilot control throttle lever 44, it is possible to manually, or otherwise, control this volume and establish or vary the resonant frequency of the resonator 22 to provide a control parameter for the rate of operation of the engine as a function of the rate of rotation of the turbine rotor. Thus by adjusting the throttle lever 44, the engine can be brought to any rate of operation desired.

It is further pointed out in said application that the resonant frequency of the resonator 22 is a function of the temperature of the fluid therein and that it is possible to modify the rate of operation of the engine as a function of inlet air temperature to the gas turbine engine. This is done by introducing a stream of air from the compressor inlet into the chamber 38 through tubes 45 which are also a part of the resonator 22.

However, in many instances, it is desirable to control the rate of operation of the gas turbine engine as a function of its actual speed of rotation rather than having such a modification factor automatically included. It is also desirable that means be provided which, in fact, indicate real turbine speed for instrumentation or other purposes such as governing or speed limiting functions.

These ends are attained in the present invention by maintaining a constant gas temperature in the chamber 38 through the preferred use of the mechanism now to be described.

A first air takeoff from the engine 10 is provided by a conduit 46 connected to the compressor discharge of the engine. A second air or gas takeoff is provided by conduit 48 connected to the turbine inlet or combustor discharge. The conduits 46 and 48 are respectively connected to flow dividers 50 and 52 of the fluid controlled type. These flow dividers are shown in greater detail in FIGURE 2 and respectively comprise power nozzles 54, 56 to which the conduits 46, 48 are respectively connected and receivers 58, 60, 62, and 64. Gas flowing from the power nozzle 54 will normally tend to flow through receiver 58 whereas gas from the power nozzle 56 will normally tend to flow through the receiver 64.

The receivers 60 and 62 (see FIGURE 1) are respectively connected by conduits 63, 65 to a plenum chamber 6 and the plenum chamber in turn is connected by a conduit 68 to one of the tubes 45 of the resonator 22 so that gas may flow therethrough and flush the interior of the chamber 38 before being discharged through the other tube 45. The resonant frequency of the resonator 22 is thus a function of the temperature of the gas derived from the plenum 66 and is a constant as will be apparent from the following description.

Reverting again to FIGURE 2, it will be seen that the flow dividers 50 and 52 also are provided with control ports 70 and 72 respectively. (In passing it will be noted that each flow divider is provided with conventional vents 73.) These control ports are connected by conduits 74, 76 to tubes 78, 80 (FIGURE 1) disposed within the plenum 66. The tubes 78 and 80 are directed against a bimetallic thermoresponsive actuator element 82 disposed therebetween.

The bimetallic element 82 may be selected to maintain a desired average temperature within the plenum 66. The bimetallic element 82 is disposed so that it is deflected toward the tube 78 when the temperature within the plenum exceeds a given limit. As this occurs, pressure is reduced at the control port 70 (due to the aspirating action of the fluid stream from nozzle 54) causing the stream from the nozzle 54 to attach itself to a wall surface 84 adjacent the control port 70 thereby diverting the relatively cool gas from the compressor into the plenum 66, by way of receiver 60. At the same time tube 80 is sufficiently pressurized to prevent the hot gas stream discharged by nozzle 56 from attaching itself to a wall surface 86 adjacent the control port 72. The hot gas stream is directed into receiver 66 and may be returned to the engine through conduit 88 to prevent unnecessary loss of energy. Alternately, when the temperature within the plenum 66 is reduced below the selected given temperature, the bimetallic element 82 is flexed in the opposite direction increasing the pressure at the control port 70 so that the low temperature stream is directed into the receiver 58 and back to the engine through conduit 90. At the same time the pressure at the control port 72 is decreased so that the high temperature stream attaches itself to the wall surface 86 and is diverted into the plenum 66 by way of receiver 62.

It is also preferred that the pressure in the plenum chamber 66 be maintained at a desired level. This end is facilitated by the preferred use of restrictive valve means 94 interposed in the conduits 63 and 65, as viewed in FIGURE 1 and more specifically shown as a vortex restrictor in FIGURE 2. Vortex restrictors are known per se to those skilled in the art and can be briefly described as a cylindrical chamber in which the upper end of the conduit from the flow divider (63 or 65) enters axially. The lower portion of this conduit opens tangentially of the cylindrical chamber. With this arrangement there is relatively little resistance to flow of fluid from either of the flow dividers into the plenum chamber 66 and a relatively high resistance to escape of fluid therefrom when either the hot gas stream or the cool gas stream is diverted back to the engine by action of the bimetallic element 82.

By mixing the hot and cool gases, the temperature of the gas within the plenum chamber 66 is maintained substantially constant and thus the temperature of the gas within the resonator 22, derived from conduit 68, is likewise a constant. The reference signal produced by the resonator is thus independent of ambient temperature and the output of the control system is a direct function of the rate of turbine rotation.

While the described means for providing a constant temperature source have unique application in accurate operation of gas turbine engines, it will, of course, be apparent to those skilled in the art that the same arrangement or modifications thereof could meet the particular demands of other systems. The scope of the invention is therefore to be derived solely from the appended claims.

Having thus described the invention, what is claimed as novel and desired to be secured by Letters Patent of the United States is:

1. Mechanism for obtaining a pressurized constant temperature fluid supply comprising
   first and second fluid flow dividers respectively connected to sources of pressurized fluids which are at different temperatures, one being relatively cool and the other being relatively hot and respectively no higher than and no lower than a given temperature,
   said flow dividers each having two outputs,
   a plenum chamber,
   conduit means connecting one output of each flow divider to said plenum chamber,
   said flow dividers each further comprising a control port providing a control stream for selectively directing fluid flow into one or the other of said outputs,
   means connecting said control ports with said plenum so that the control streams are derived therefrom, and
   means responsive to the temperature within said plenum for controlling the pressurization of said control ports so that when the temperature in said plenum is above said given temperature the flow from the cool source is diverted into said plenum and when below said given temperature fluid from the hot source is diverted therein.

2. Mechanism as in claim 1 wherein conduits extend respectively from each of said control ports and terminate in opposed relation within said plenum chamber, and the means responsive to temperature within said plenum comprises a cantilevered element disposed between said tubes, said element having the characteristic of flexing towards and away from the ends of said tubes in response to temperature changes within said plenum chamber, thus varying the pressure at said control ports to so divert the fluid streams from the hot and cool sources.

3. Mechanism as in claim 2 wherein flow restrictors are respectively provided in the conduit means connecting the outputs of the flow dividers to the plenum chamber.

4. Mechanism as in claim 3 wherein the flow restrictors are of the vortex type comprising a cylindrical chamber with the flow divider being connected axially of the chamber and the plenum chamber being connected tangentially of said cylindrical chamber to thereby provide a low impedance to fluid flow into said chamber and a high impedance to fluid flow in the reverse direction.

References Cited

UNITED STATES PATENTS

| | | | |
|---|---|---|---|
| 2,815,915 | 12/1957 | Salerno | 236—13 |
| 2,835,449 | 5/1958 | Joesting | 236—13 |
| 3,198,214 | 8/1965 | Lorenz | 137—81.5 X |
| 3,267,949 | 8/1966 | Adams | 137—81.5 |
| 3,288,365 | 11/1966 | Shiiki | 137—81.5 X |

JULIUS E. WEST, *Primary Examiner.*